United States Patent [19]

Small et al.

[11] 3,951,386
[45] Apr. 20, 1976

[54] UNIFORM MIXING IN VESSELS

[75] Inventors: William M. Small; Donald K. Petree, both of Bartlesville, Okla.

[73] Assignee: Phillips Petroleum Company, Bartlesville, Okla.

[22] Filed: Mar. 31, 1975

[21] Appl. No.: 563,399

[52] U.S. Cl. .............................. 259/1 R; 259/108; 259/DIG. 19
[51] Int. Cl.² ........................................ B01F 15/00
[58] Field of Search ............ 259/1 R, 106, 107, 108, 259/109, 110, DIG. 19, 185, 191, 192, 193; 236/78; 425/135, 144; 23/293 R, 259

[56] References Cited
UNITED STATES PATENTS
3,751,014   8/1973   Waterloo ........................... 259/191

FOREIGN PATENTS OR APPLICATIONS
45-39590   12/1970   Japan ........................... 259/DIG. 19

Primary Examiner—Stanley N. Gilreath
Assistant Examiner—Alan Cantor

[57] ABSTRACT

In order to obtain uniform mixing of materials in an agitated vessel, temperature measurements are made at two regions of the vessel spaced from one another. The amount of agitation imparted to the vessel is adjusted until the two measured temperatures are the same.

8 Claims, 1 Drawing Figure

U.S. Patent    April 20, 1976    3,951,386
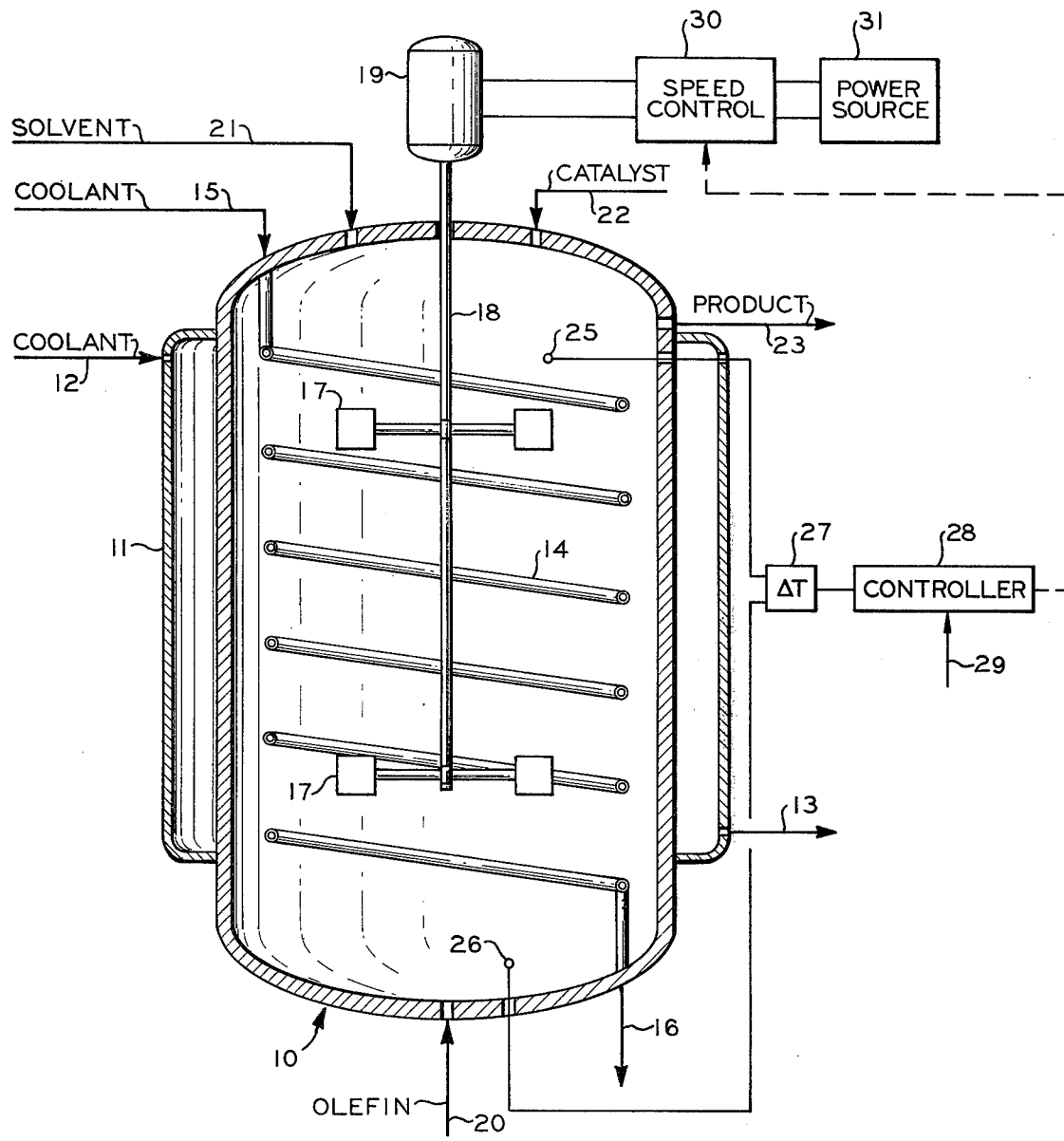

UNIFORM MIXING IN VESSELS

In the chemical industry it is often necessary to mix materials to provide uniform blends. This is particularly true in chemical reactions which involve a transfer of heat either into or from the reactor. For example, exothermic polymerization reactions are often carried out in stirred vessels which are provided with cooling coils. It is desirable to obtain intimate mixing of the reactants in order to obtain efficient heat transfer and thus rapid conversion. One important factor in the design of such a process is the amount of agitation required to obtain uniform mixing. Poor mixing increases the conversion time and can result in nonuniform products. Excessive mixing, on the other hand, is wasteful of mixing energy and can increase the cooling load due to excessive heat being imparted by mechanical mixing means.

A number of procedures have been utilized for estimating mixing requirements in agitated vessels, examples of which can be found in *Chemical Engineers Handbook*, Fifth Edition, Section 19, McGraw-Hill, New York 1973, and *Mixing Theory and Practice*, Uhl and Gray, Volumes 1 and 2, Academic Press, New York 1966-7. In general, most of these procedures estimate power or agitator requirements from formulas which involve densities, viscosities and Reynolds number. Unfortunately, these formulas often do not provide the necessary design information because of such factors as unusual vessel configurations, variable process conditions, and fluid properties which may not be known precisely at process conditions. A particularly difficult problem exists when the fluids are non-Newtonian and the viscosity varies with shear rate.

In accordance with this invention, a simple method has been found for determining the amount of mixing which must be imparted to a vessel in order to obtain a uniform blend of materials therein. This procedure is based on temperature measurements at two spaced locations within the vessel. Agitation is imparted to the vessel until any measured temperature differential becomes substantially zero. This indicates that uniform mixing of the materials has occurred. In accordance with one specific embodiment of this invention, the amount of agitation imparted to the vessel is controlled in response to the temperature measurements so that the minimum amount of agitation required to obtain uniform mixing is employed.

The accompanying drawing is a schematic representation of one embodiment of apparatus of this invention.

Element 10 of the drawing represents a vessel in which a chemical reaction, such as an olefin polymerization, is conducted. Such a process is described in detail in U.S. Pat. No. 2,825,721, for example. Reactor 10 is provided with a jacket 11 through which a coolant is circulated by conduits 12 and 13. Reactor 10 is also provided with an internal cooling coil 14 through which coolant is circulated by conduits 15 and 16. Reactor 10 is provided with an agitator in the form of paddles 17 mounted on a rotatable shaft 18, the latter being driven by a variable speed motor 19. Reactor 10 can be of the type described in detail in U.S. Pat. No. 2,875,027, for example.

In a specific polymerization reaction, the olefin to be polymerized is introduced into reactor 10 through a conduit 20. A solvent is introduced through a conduit 21, and a slurry of catalyst is introduced through a conduit 22. Polymer product is withdrawn through a conduit 23. Conduits 20, 21, 22 and 23 can thus correspond to respective conduits 35, 34, 28 and 36 of U.S. Pat. No. 2,875,027, for example.

In accordance with this invention, temperature sensing elements 25 and 26 are positioned within reactor 10 so as to be in thermal contact with the reactor contents. It is desirable that sensing elements 25 and 26 be spaced substantial distances apart within the reactor. It is also desirable that these two sensing elements be located at different vertical elevations. They should be located in the main body of fluid, and not shielded by a baffle or other reactor element. Sensing elements 25 and 26 are connected to a temperature differential measuring element 27. In one embodiment, element 27 can comprise an indicator to provide a visual representation of the temperature difference sensed by elements 25 and 26. As an alternative, element 27 can be a conventional temperature indicator or recorder which measures the individual output signals of elements 25 and 26. In this embodiment, an operator can observe the two measured temperatures and determine any difference therebetween. Elements 25 and 26 can be any type of suitable temperature detectors, such as thermocouples or thermistors, for example.

In the illustrated embodiment, element 27 provides an output signal which is representative of any measured temperature differential. This signal is applied as the input signal to a conventional controller 28 which is provided with a setpoint adjustment 29. Controller 28 provides an output signal which is representative of any difference between the input signal and the setpoint. This output signal is applied to a speed control device 30 which regulates the power supplied to motor 19 from a power source 31. In order to provide a practical control system of this type, the setpoint signal 29 is not precisely zero, the desired temperature differential, but rather a value representative of a temperature difference closely approximating zero. The exact value of this setpoint, which can be a fraction of a degree, depends to some extent on the sensitivity of the controller. If a setpoint of exactly zero were employed, the controller might overshoot the setpoint and drive the motor at an excessive speed. Controller 28 thus serves to regulate the speed at which paddles 17 are rotated so as to provide the minimum amount of mixing necessary to reduce the measured temperature differential to substantially zero. Under this condition, it is known that a uniform blend of the reactor contents has been obtained.

As an alternative to the automatic control system illustrated in the drawing, an operator can adjust the speed of motor 19 in response to the measured temperature differential so that the motor is rotated at a speed sufficient to reduce the temperature differential to zero.

While this invention has been described in conjunction with presently preferred embodiments, it obviously is not limited thereto.

What is claimed is:

1. In a process in which material in a vessel is agitated to provide a uniform blend; the method of control which comprises comparing the temperature of the material at a first location within the vessel with the temperature of the material at a second location within the vessel spaced from the first location to detect any temperature differential therebetween, and regulating the agitation imparted to the material in the vessel so as to reduce the temperature differential substantially to zero with minimum agitation.

2. The method of claim 1 wherein the first and second locations are at different vertical elevations.

3. The method of claim 1 which comprises establishing a first signal representative of any temperature differential between the temperatures of the material at the first and second locations; comparing the first signal with a second setpoint signal which is representative of a temperature differential closely approximating, but not equal to, zero and establishing a third signal representative of any difference between the first and second signals; and regulating the agitation to tend to reduce the third signal to zero.

4. In a system which includes a vessel having agitation means therein to promote mixing of materials within the vessel; apparatus for use in controlling mixing within the vessel comprising first and second temperature sensing elements positioned to sense the temperature of material within the vessel at respective first and second locations within the vessel spaced from one another; and means connected to said first and second elements to establish a signal representative of any temperature difference sensed by said first and second elements.

5. The apparatus of claim 4 wherein said first and second elements are positioned at different vertical elevations.

6. The apparatus of claim 4, further comprising means responsive to said signal to regulate said agitation means to tend to reduce said signal to zero.

7. The apparatus of claim 6 wherein said means to reduce comprises a controller having a measurement input; a setpoint input, and an output; said signal is applied to said measurement input; and the output of said controller regulates said agitation means.

8. The apparatus of claim 7 wherein said agitation means is actuated by a variable speed motor, and wherein the output of said controller adjusts the speed of said motor.

* * * * *